(12) United States Patent
Fulgham

(10) Patent No.: US 7,229,237 B1
(45) Date of Patent: Jun. 12, 2007

(54) TOOL FOR REMOVING AN OBJECT FROM A WORKPIECE

(76) Inventor: Charles A. Fulgham, 201 Bedford Dr., Brooklyn, MI (US) 49230

( * ) Notice: Subject to any disclaimer, the term of this patent is extended or adjusted under 35 U.S.C. 154(b) by 657 days.

(21) Appl. No.: 10/463,296

(22) Filed: Jun. 17, 2003

Related U.S. Application Data

(60) Provisional application No. 60/389,444, filed on Jun. 17, 2002.

(51) Int. Cl.
B23B 47/28 (2006.01)

(52) U.S. Cl. .................. 408/115 R; 408/72 B

(58) Field of Classification Search ............... 408/1 R, 408/72 B, 115 B, 79, 97, 115 R, 241 B; 81/441
See application file for complete search history.

(56) References Cited

U.S. PATENT DOCUMENTS

| | | | | |
|---|---|---|---|---|
| 2,341,418 A | * | 2/1944 | Atkins | 33/578 |
| 2,383,953 A | * | 9/1945 | Beard | 408/84 |
| 2,435,256 A | * | 2/1948 | Whitmore | 408/115 R |
| 2,619,730 A | * | 12/1952 | Clarence | 33/666 |
| 2,810,310 A | * | 10/1957 | Saunders | 408/109 |
| 3,148,562 A | * | 9/1964 | Moss | 408/75 |
| 3,674,376 A | * | 7/1972 | Silken | 408/115 R |
| 4,669,926 A | * | 6/1987 | Wilcox, Jr. | 408/1 R |
| 4,759,666 A | * | 7/1988 | Grab | 408/115 B |
| 5,051,045 A | * | 9/1991 | Bonde | 408/115 R |

OTHER PUBLICATIONS

Webpage—United California Corporation pp. 1-5 (2001).

* cited by examiner

Primary Examiner—Monica Carter
Assistant Examiner—Sara Addisu
(74) Attorney, Agent, or Firm—Mary M. Moyne; Fraser, Trebilcock, Davis & Dunlap, P.C.

(57) ABSTRACT

A tool for removing an object from a hole in a workpiece which includes a first and second arm pivotably connected together. Each arm having an opening between the ends. The second arm also has a drill hole at the second end. A liner bushing and a drill bushing can be provided in the drill hole. To remove the object from the workpiece, the drill hole is positioned over the object and the arms are adjusted until at least one (1) of the openings of one of the arms is positioned over an existing hole in the workpiece. A securing bolt is then inserted through the opening in the arm into the hole in the workpiece and tightened to secure the tool to the workpiece. Next, a drill bit is positioned in the opening of the drill bushing adjacent the object and rotated until the drill bit is completely through the object.

20 Claims, 5 Drawing Sheets

TOOL FOR REMOVING AN OBJECT FROM A WORKPIECE

CROSS-REFERENCE TO RELATED APPLICATION

This application claims the benefit of U.S. Provisional Application Ser. No. 60/389,444, filed Jun. 17, 2002.

STATEMENT REGARDING FEDERALLY SPONSORED RESEARCH OR DEVELOPMENT

Not Applicable

BACKGROUND OF THE INVENTION (1) Field of the Invention

The present invention relates to a tool which allows for quick and easy removal of objects from a hole in a workpiece. In particular, the tool of the present invention allows for quick and accurate removal of broken bolts from threaded holes in engine components.

(2) Related Art

In the past, objects, such as broken bolts, which were stuck in holes in a workpiece were removed from the holes by free hand drilling. However, there are many problems associated with the use of free hand drilling. Mainly, it is difficult to quickly align the drill bit with the center of the broken bolt. It is also difficult to maintain the alignment which results in crooked drilling and damage to the hole. One (1) solution was to use a drill bar such as the adjustable drill bar by United California Corporation. However, the adjustable drill bar is a unitary piece, which limits its use. To use the adjustable drill bar, the securing hole in the workpiece which is used to secure the adjustable drill bar to the workpiece must be in a straight line with the broken bolt to be removed. In addition, the securing hole must be a distance from the broken bolt less than the length of the bar. This greatly reduces the versatility of the tool.

There remains a need for a tool which is adjustable accurately and securely positioned over an object in a workpiece to enable accurate and quick removal of the object from the workpiece using a drill.

SUMMARY OF THE INVENTION

The present invention is a tool which enables fast and easy removal of an object such as a broken bolt from a workpiece such as an automobile engine block or other engine component. The tool enables a user to quickly and easily align a drill bit over the object to be removed. The tool also enables the user to keep the drill bit aligned with the object during drilling. The tool includes a first arm and a second arm which are pivotably connected together. The pivotable nature of the arms enables the tool to be adjusted to a variety of positions to allow the tool to be secured to the workpiece using existing holes in the workpiece. The first end of the first arm is pivotably connected to the second end of the second arm. In one (1) embodiment, the first arm has an extension at the first end extending outward from one (1) side and the second arm is pivotably connected to the extension of the first arm. The second arm is able to pivot approximately 180° with respect to the first arm.

The first arm has an opening which extends along the longitudinal axis of the first arm. The second arm has a drill hole at the second end and an opening which extends essentially between the drill hole and the first end of the second arm along the longitudinal axis of the second arm. In one (1) embodiment, a liner bushing and a drill bushing are provided for mounting in the drill hole. In one (1) embodiment, a locking screw is provided adjacent the drill hole. The locking screw contacts the drill bushing in the drill hole and prevents the drill bushing from rotating during use. The tool can also be provided as a kit which includes the tool and a variety of different sized drill bushings, drill bits and one (1) or more taps.

To use the tool to remove an object from a workpiece, the drill hole of the tool is positioned over the object to be removed. In one (1) embodiment, the object is a broken bolt and the drill hole is centered over the broken bolt. Next, the arms of the tool are adjusted until at least one (1) of the openings of one of the arms is positioned over an existing threaded hole in the workpiece. A securing bolt is then inserted through the opening in the arm into the threaded hole in the workpiece and tightened to secure the tool to the workpiece. Next, a drill bushing is positioned in the liner bushing in the drill hole. The user then positions the drill so that the drill bit is in the opening of the drill bushing adjacent the object and then begins drilling. The user drills until the drill bit is completely through the object. The tool with the drill bushing ensures that the drill bit remains aligned with the object during drilling. In one (1) embodiment, after drilling, a tap is used to clean the debris of the object from the threads of the hole in the workpiece.

The present invention relates to a tool for use with a drill for removing an object from a hole in a workpiece, which comprises: a first arm having a first end and a second end and having an opening between the ends; a second arm having a first end and a second end and having an opening between the ends and having a drill hole adjacent the second end, wherein the second arm is pivotably connected at the first end to the second end of the first arm; and a securing bolt for inserting through the opening of the first arm or the opening of the second arm and into the workpiece to secure the tool to the workpiece so that when the tool is secured to the workpiece, the drill hole of the second arm remains adjacent the object.

Further, the present invention relates to a kit for use with a drill for removing an object from a workpiece, which comprises: a tool having a first arm having a first end and a second end forming a longitudinal axis of the first arm, the first arm having an opening between the ends; a second arm having a first end and a second end forming a longitudinal axis of the second arm, the second arm having an opening between the ends and having a drill hole adjacent the second end, wherein the second arm is pivotably connected at the first end to the second end of the first arm; and a securing bolt for inserting through the opening of the first arm or the opening of the second arm and into the workpiece to secure the tool to the workpiece so that in use the drill hole of the second arm is adjacent the object; and at least one drill bushing for mounting in the drill hole.

Finally, the present invention relates to a method for removing an object from a first hole in a workpiece, which comprises the steps of: providing a tool including: a first arm having a first end and a second end and between the ends; a second arm having a first end and a second end and having an opening between the ends and having a drill hole adjacent the second end, wherein the second arm is pivotably connected at the first end to the second end of the first arm; positioning the tool on the workpiece such that the drill hole is adjacent to the object; adjusting the arms of the tool such that the drill hole remains adjacent to the object and at least one of the openings of one of the arms is aligned with a second hole in the workpiece; securing the tool to the workpiece by inserting a securing bolt through one of the openings of the one of the arms into the second hole in the workpiece; providing a drill having a drill bit; inserting the drill bit through the drill hole; and rotating the drill bit such that the drill bit enters the object and removes the object from the first hole in the workpiece.

The substance and advantages of the present invention will become increasingly apparent by reference to the following drawings and the description.

DESCRIPTION OF THE PREFERRED EMBODIMENTS

Figure 1:
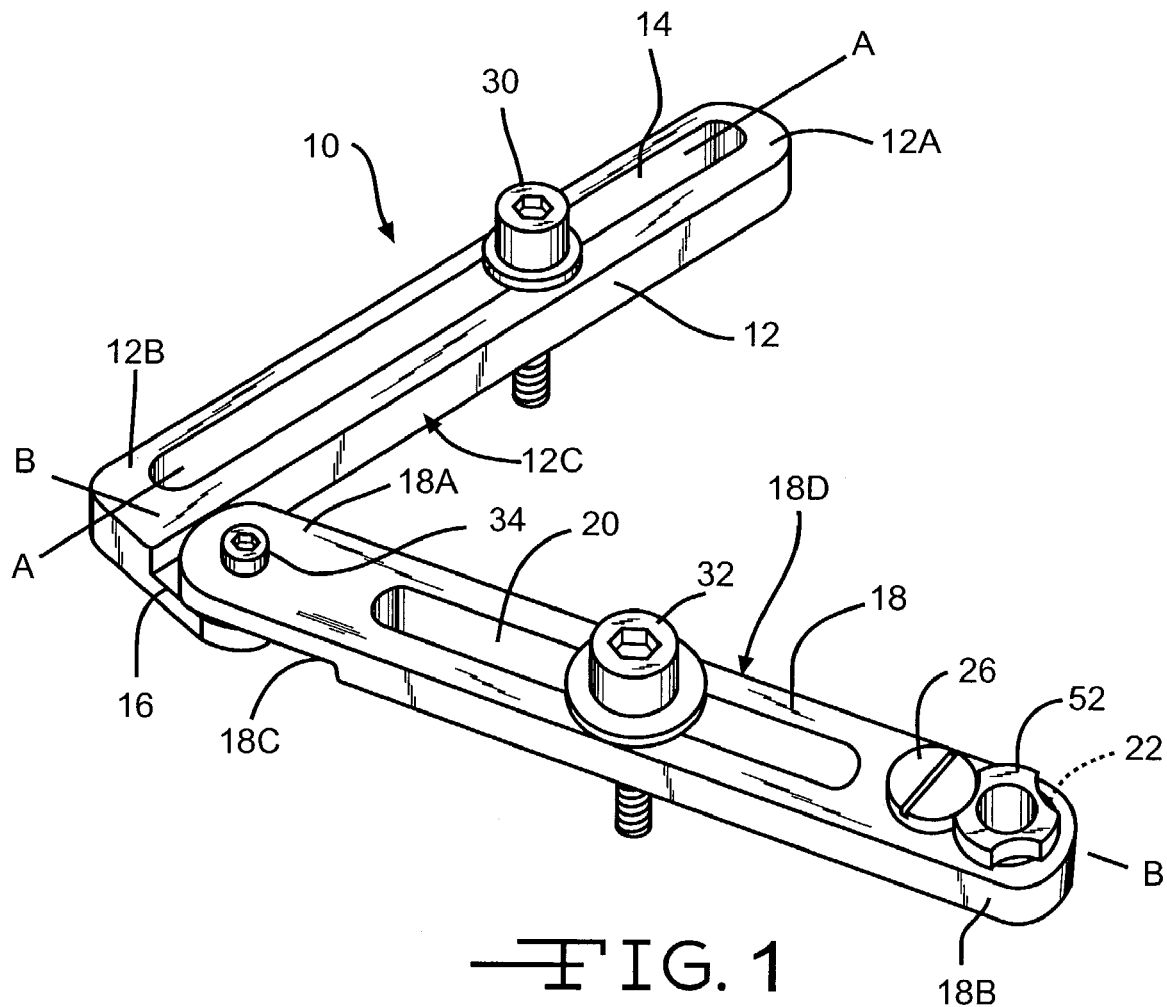
FIG. 1 is a perspective view of the tool 10 of the present invention.
Figure 3:
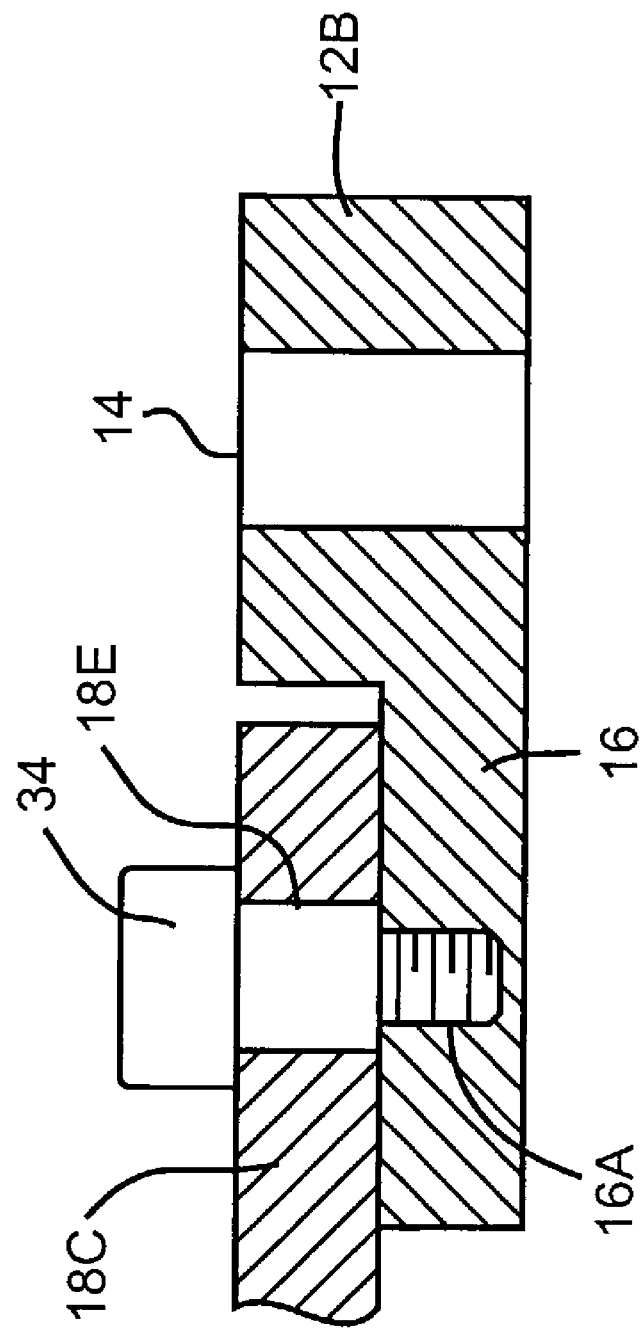
FIG. 3 is a cross-sectional view of FIG. 2 along the line 3—3 showing the first section 18C of the second arm 18 attached to the extension 16 of the first arm 12.

The tool 10 of the present invention includes a first arm or bracket 12 and a second arm or bracket 18 pivotally connected together. The first arm 12 has opposed first and second ends 12A and 12B forming a longitudinal axis A—A of the first arm 12 (FIG. 1). The first arm 12 has an opening 14 spaced between the ends 12A and 12B. In one (1) embodiment, the opening 14 is a slot which extends between the ends 12A and 12B along the longitudinal axis A—A of the first arm 12. The slot 14 is closed at both ends. The width of the slot 14 depends on the diameter of the securing bolt 30 or 32 used to secure the tool 10 to the workpiece 100. An extension 16 extends outward from the inner side 12C of the first arm 12 at the second end 12B adjacent the bottom side of the first arm 12. In one (1) embodiment, the bottom side of the extension 16 is in the same plane as the bottom side of the first arm 12. The extension 16 has a thickness less than the thickness of the remainder of the first arm 12 such that the top side of the extension 16 is below the top side of the first arm 12. The extension 16 has a hole 16A (FIG. 3). In one (1) embodiment, the hole 16A is in the center of the extension 16.

Figure 1A:
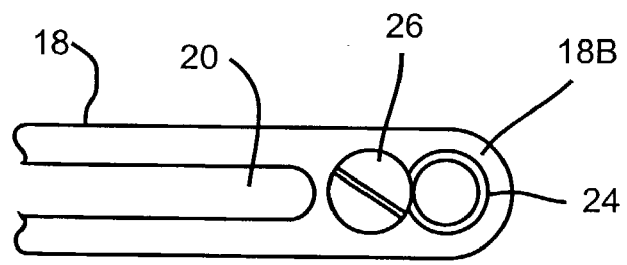
FIG. 1A is a partial view of the second end 18B of the second arm 18 showing the liner bushing 24.
Figure 2:
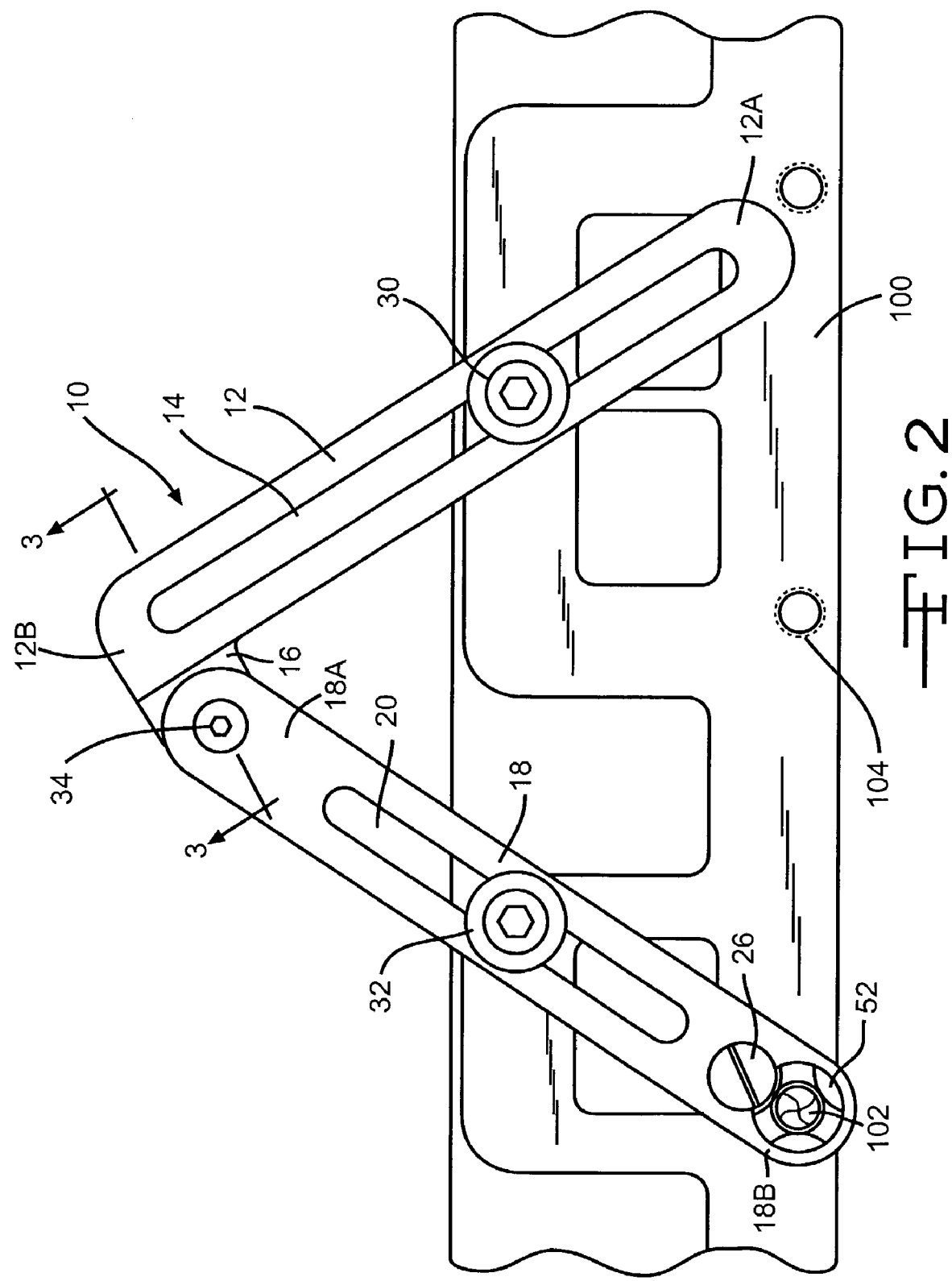
FIG. 2 is a top view of the tool 10 in use on a workpiece 100.

The second arm 18 has opposed first and second ends 18A and 18B forming a longitudinal axis B—B of the second arm 18 (FIG. 1). The second arm 18 has an opening 20 spaced between the ends 18A and 18B. In one (1) embodiment, the opening 20 is a slot which extends part of the distance between the ends 18A and 18B along the longitudinal axis B—B. The slot 20 is closed at both ends. In one (1) embodiment, the width of the slot 20 depends on the diameter of the securing bolt 30 or 32 used to secure the tool 10 to the workpiece 100. The bottom side of the first end 18A of the second arm 18 has a cut out or first section 18C which begins at the first end 18A and extends inward toward the second end 18B. The first section 18C extends the entire width of the second end 18 at the first end 18A. The first section 18C does not extend to the slot 20. The first section 18C has a thickness less than the thickness of the remainder of the second arm 18. In one (1) embodiment, the top side of the first section 18C is in the same plane as the top side of the remainder of the second arm 18. In one (1) embodiment, the second arm 18 has a hole 18E in the first section 18C (FIG. 3). A drill hole 22 is located at the second end 18B of the second arm 18. In one (1) embodiment, the drill hole 22 is of a size such as to extend essentially the entire width of the second arm 18 at the second end 18B. In one (1) embodiment, the second end 18B of the second arm 18 is rounded and follows the shape of the drill hole 22. A liner bushing 24 having a center hole is provided in the drill hole 22 (FIG. 1A). A drill bushing 52 is also provided for mounting in the drill hole 22. The liner bushing 24 provides a smooth inner surface having a set diameter such as to accommodate a drill bushing 52 having a center opening 52A. The inner diameter of the liner bushing 24 is a standard size which allows for mounting standard drill bushings. The liner bushing 24 allows for easier mounting of standard drill bushings in the drill hole 22 and prevents damage to the drill hole 22. If the liner bushing 24 becomes worn or damaged, the liner bushing 24 can be easily replaced. The liner busing 24 in one (1) embodiment is constructed of hardened steel. In one (1) embodiment, the drill bushing 52 is a standard drill bushing similar to a slip fixed renewable drill bushing. In one (1) embodiment, the drill bushing 52 is constructed of hardened steel. A lock screw hole can also be provided adjacent the second end 18B of the second arm 18 adjacent the drill hole 22. The lock screw hole is threaded and is accessible from either side. A lock screw 26 having an enlarged head is provided for inserting into the lock screw hole. In one (1) embodiment, the slot 20 of the second arm 18 extends between the lock screw hole and the first section 18C along the longitudinal axis B—B of the second arm 18.

Figure 5:
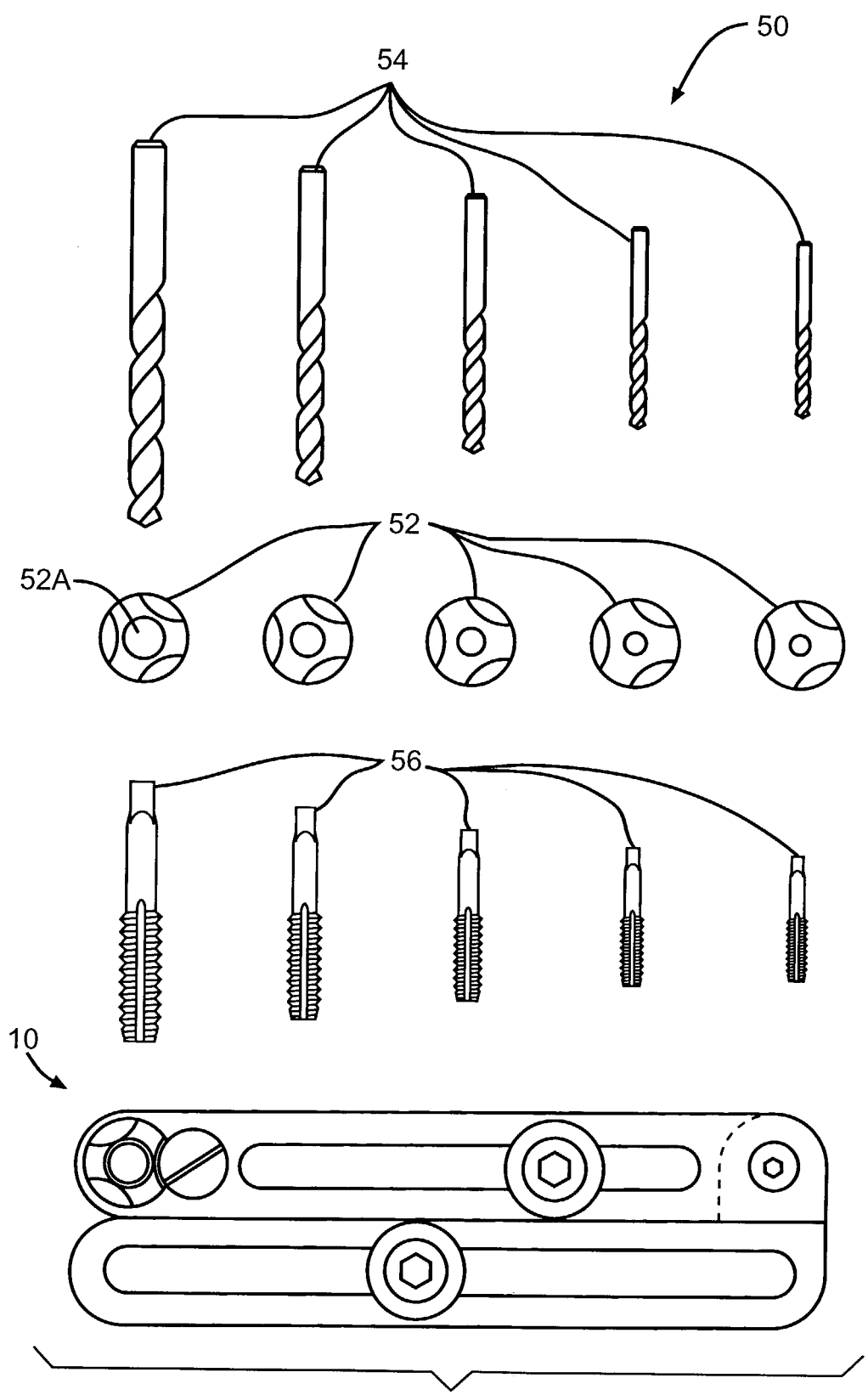
FIG. 5 is a top view of the kit 50 showing the tool 10, the drill bushings 52, the drill bits 54 and the taps 56.

The first end 18A of the second arm 18 is pivotally connected to the extension 16 at the second end 12B of the first arm 12. In one (1) embodiment, the arms 12 and 18 are connected together by a pivot bolt 34 which extends through the hole 16A in the extension 16 and through the hole 18E in the first section 18C of the second arm 18. When the first section 18C of the second arm 18 is mated with the extension 16 of the first arm 12, the combined thickness is equal to the thickness of the remainder of the first or second arm 12 or 18. In one (1) embodiment when the first arm 12 and second arm 18 are connected together, the top surface of the first arm 12 is in the same plane as the top surface of the second arm 18. In one (1) embodiment when the first arm 12 and the second arm 18 are connected together, the bottom surface of the first arm 12 is in the same plane as the bottom surface of the second arm 18. In one (1) embodiment, the first and second arms 12 and 18 have the same length, width and thickness and have rounded ends to reduce the risk of injury to the user. The first and second arms 12 and 18 can be constructed of any well known, durable material such as AISI 1018 cadmium plate or black oxide. The tool 10 can be provided as part of a kit 50 which also includes several drill bushings 52 having a variety of sizes, drill bits 54 and one (1) or more taps 56 (FIG. 5).

Figure 4:
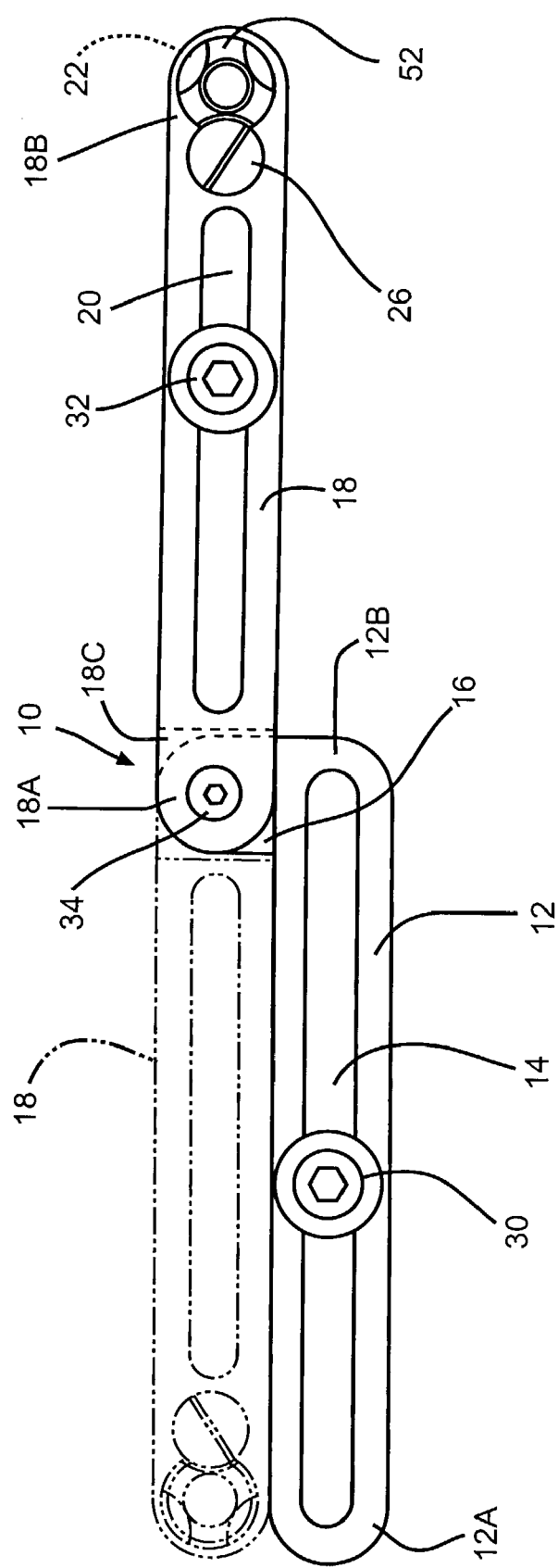
FIG. 4 is a top view of the tool 10 with the second arm 18 in the fully open position and showing the second arm 18 in the fully closed position in phantom.

The tool 10 is used to remove objects 102 which are stuck in a hole in a workpiece 100. In one (1) embodiment, the tool 10 is used to remove broken bolts 102 from threaded holes 104 in engine components. To use the tool 10, any excess sections of object or broken bolt 102 extending above the workpiece surface are removed, such as by grinding. Next, the drill hole 22 in the second end 18B of the second arm 18 is aligned with the center of the object or broken bolt 102. In one (1) embodiment, the liner bushing 24 is secured in the drill hole 22 before the tool 10 is used. The tool 10 is then secured to the workpiece 100. In one (1) embodiment, the tool 10 is able to be secured to the workpiece 100 with either the top surface or the bottom surface of the arms 12 and 18 adjacent the surface of the workpiece 100. In one (1) embodiment, the tool 10 is secured to the workpiece 100 by inserting securing bolts 30 and 32 through the openings 14 and 20 in the first and second arms 12 and 18 into threaded holes 104, such as bolt holes in the workpiece 100. In one (1) embodiment where the openings are slots, the slots 14 and 20 allow the securing bolts 30 and 32 to be moved to various positions along the length of the arms 12 and 18. To position the slots 14 and 20 over the threaded holes 104 in the workpiece 100, one (1) or both of the first and second arms 12 and 18 can be moved. The second arm 18 can be pivoted about the drill hole 22 which is aligned over the object or broken bolt 102. The first arm 12 can be pivoted at the pivot bolt 34 where it connects to the second arm 18. The reduced thickness of the first section 18C at the first end 18A of the second arm 18 in combination with the reduced thickness of the extension 16 of the first arm 12 allows the arms 12 and 18 to pivot 180° with respect to each other. In one (1) embodiment, the arms 12 and 18 can pivot approximately 180° with respect to each other. Thus, in the fully closed position, the first end 12A of the first arm 12 is adjacent the second end 18B of the second arm 18 and the inner side 12C of the first arm 12 is adjacent the inner side 18D of the second arm 18. In the fully open position, the first end 12A of the first arm 12 is spaced apart 180° from the second end 18B of the second arm 18 (FIG. 4). The ability of the arms 12 and 18 to pivot allows for greater versatility when positioning the arms 12 and 18 to enable the securing bolts 30 and 32 to be inserted into a threaded hole 104 in the workpiece 100. The size of the securing bolts 30 or 32 is chosen such that the securing bolts 30 or 32 can be threaded into the threaded holes 104 in the workpiece 100. In one (1) embodiment, one (1) securing bolt 30 or 32 is used in each of the slots 14 or 20 of the arms 12 and 18 to secure each of the arms 12 and 18 of the tool 10 to the workpiece 100. However, the tool 10 could also be secured using a single securing bolt 30 or 32 in one (1) of the slots 14 or 20 of one (1) of the arms 12 or 18. In the embodiment using only a single securing bolt 30 or 32 to secure one of the arms 12 or 18, a C-clamp (not shown) can be used to secure the other arm 12 or 18 to the workpiece 100.

Once the tool 10 is secured to the workpiece 100, a drill bushing 52, corresponding to the size or diameter of the object or broken bolt 102 to be removed, is inserted into the liner bushing 24 in the drill hole 22. Next, the lock screw 26 is threaded into the lock screw hole adjacent the drill bushing 52. The lock screw 26 has an enlarged head such that the head of the lock screw 26 extends over the liner bushing 24. The drill bushing 52 has a flat portion in its perimeter which accommodates the enlarged head of the lock screw 26. The enlarged head of the lock screw 26 contacts edges of the flat portion of the drill bushing 52 and prevents the drill bushing 52 from rotating during use. Next, a drill bit 54 is inserted into the center opening 52A of the drill bushing 52. The positioning of the drill hole 22 and the use of the drill bushing 52 ensures that the drill bit 54 is directly aligned with the center of the object 102 to be removed. In one (1) embodiment where the object is a broken bolt 102, the drill bit 54 is chosen using a standard tap drill chart. First, the correct drill bit diameter for the set diameter of the broken bolt is determined. Then a drill bit 54 having a size 0.005 inch (0.013 cm) greater than the determined size is chosen to remove the broken bolt 102. By using a drill bit 54 which is larger than the standard drill bit recommended by the chart, the drill bit 54 is able to completely separate the center of the broken bolt 102 from its threads. The use of the tool 10 enables the drill bit 54 to be directly aligned with the broken bolt 102 to be removed and to remain aligned with the center of the broken bolt 102. Thus, allowing the use of a larger diameter drill bit 54 without damaging the bolt hole. The diameter of the drill bit 54 is less than the size or diameter of the object or broken bolt 102. In one (1) embodiment, the drill bit 54 is a standard tap drill bit. Once the correct drill bit 54 is selected, the drill bit 54 is then mounted in a drill. In one (1) embodiment, the drill is a hand drill. In another embodiment, the drill is a drill press. The drill bit 54 is activated and rotated into and through the center of the object or broken bolt 102 until the drill bit 54 breaks through the bottom end of the object or broken bolt 102. The size of the drill bushing 52 is such that the drill 54 can not move during use and thus, remains straight and aligned with the center of the object 102 during removal of the object 102. Continued alignment of the drill 54 prevents damage to the bolt hole. Once the drill 54 has been used, the tool 10 is removed from the workpiece 100. The debris can then be removed from the bolt hole such as by using high pressure air. Optionally, a tap 56 can then be used to clean out the threads of the bolt hole, if necessary, to remove any pieces of the broken bolt 102 from the threads of the bolt hole. The tap 56 may also be used to rethread the bolt hole if necessary.

It is intended that the foregoing description be only illustrative of the present invention and that the present invention be limited only by the hereinafter appended claims.

I claim:

1. A tool for use with a drill for removing an object from a hole in a workpiece, which comprises:
    (a) a first arm having a first end and a second end and having an opening between the ends;
    (b) a second arm having a first end and a second end and having an opening between the ends and having a drill hole adjacent the second end, wherein the second arm is pivotably connected at the first end to the second end of the first arm; and
    (c) a pair of securing bolts, one of the securing bolts configured to be inserted through the opening of the first arm into the workpiece and the other of the securing bolts configured to be inserted through the opening of the second arm and into the workpiece to secure the tool to the workpiece so that when the tool is secured to the workpiece, the drill hole of the second arm remains adjacent the object.

2. The tool of claim 1 wherein the first arm has an inner side extending between the ends and wherein the first arm has an extension which extends outward from the inner side.

3. The tool of claim 2 wherein the first end of the second arm is pivotably connected to the extension of the first arm.

4. The tool of claim 3 wherein the extension of the first arm has a thickness less than a thickness of the first arm at the first end and the first end of the second arm has a thickness less than a thickness of the second arm at the second end.

5. The tool of claim 2 wherein the second arm has an inner side extending between the ends and wherein in a closed position, the inner side of the second arm is adjacent the inner side of the first arm.

6. The tool of claim 1 wherein the second arm is connected to the first arm so that in a fully open or fully closed position, a longitudinal axis of the second arm is parallel to a longitudinal axis of the first arm.

7. The tool of claim 1 wherein the second arm is able to pivot a maximum of 180° on the first arm.

8. The tool of claim 1 wherein the opening of the first arm is a close ended opening which extends essentially an entire distance between the ends of the first arm along a longitudinal axis of the first arm formed by the ends of the first arm.

9. The tool of claim 1 wherein the securing bolts are of such a size as to be easily inserted into the openings of the first or second arms.

10. The tool of claim 1 wherein the first arm has a first surface extending between the ends and wherein the second arm has a first surface extending between the ends and wherein the second arm is connected to the first arm so that the first surface of the first arm is in a same plane as the first surface of the second arm.

11. The tool of claim 1 wherein the opening in the second arm is a slot extending essentially between the drill hole and the first end of the second arm along a longitudinal axis of the arm formed by the ends of the second arm.

12. The tool of claim 1 wherein a liner bushing is provided for mounting in the drill hole.

13. The tool of claim 1 wherein a drill bushing is provided for mounting in the drill hole and assists in centering the drill over the object.

14. The tool of claim 13 wherein a lock screw is provided in the second end of the second arm adjacent the drill hole and contacts the drill bushing to prevent the drill bushing from rotating.

15. The tool of claim 14 wherein a head of the drill bushing has a flat spot which contacts a head of the lock screw to prevent the drill bushing from rotating in the drill hole.

16. The tool of claim 13 wherein the object has a circular cross-section and wherein a diameter of an opening of the drill bushing is dependent on a diameter of the object.

17. The tool of claim 1 wherein the object is a broken bolt and the workpiece is an engine component and wherein the securing bolts are configured to be inserted into existing holes in the engine component.

18. A kit for use with a drill for removing an object from a workpiece, which comprises:

(a) a tool having a first arm having a first end and a second end forming a longitudinal axis of the first arm, the first arm having an opening between the ends; a second arm having a first end and a second end forming a longitudinal axis of the second arm, the second arm having an opening between the ends and having a drill hole adjacent the second end, wherein the second arm is pivotably connected at the first end to the second end of the first arm; and a pair of securing bolts, one of the securing bolts configured to be inserted through the opening of the first arm into the workpiece and the other of the securing bolts configured to be inserted through the opening of the second arm and into the workpiece to secure the tool to the workpiece so that in use the drill hole of the second arm is adjacent the object; and (b) at least one drill bushing for mounting in the drill hole.

19. The kit of claim 18 including at least one drill bit.

20. The kit of claim 18 including a tap.

\* \* \* \* \*